July 2, 1946. W. B. STEPHENSON 2,403,134
CHARCOAL BURNER
Filed June 13, 1942
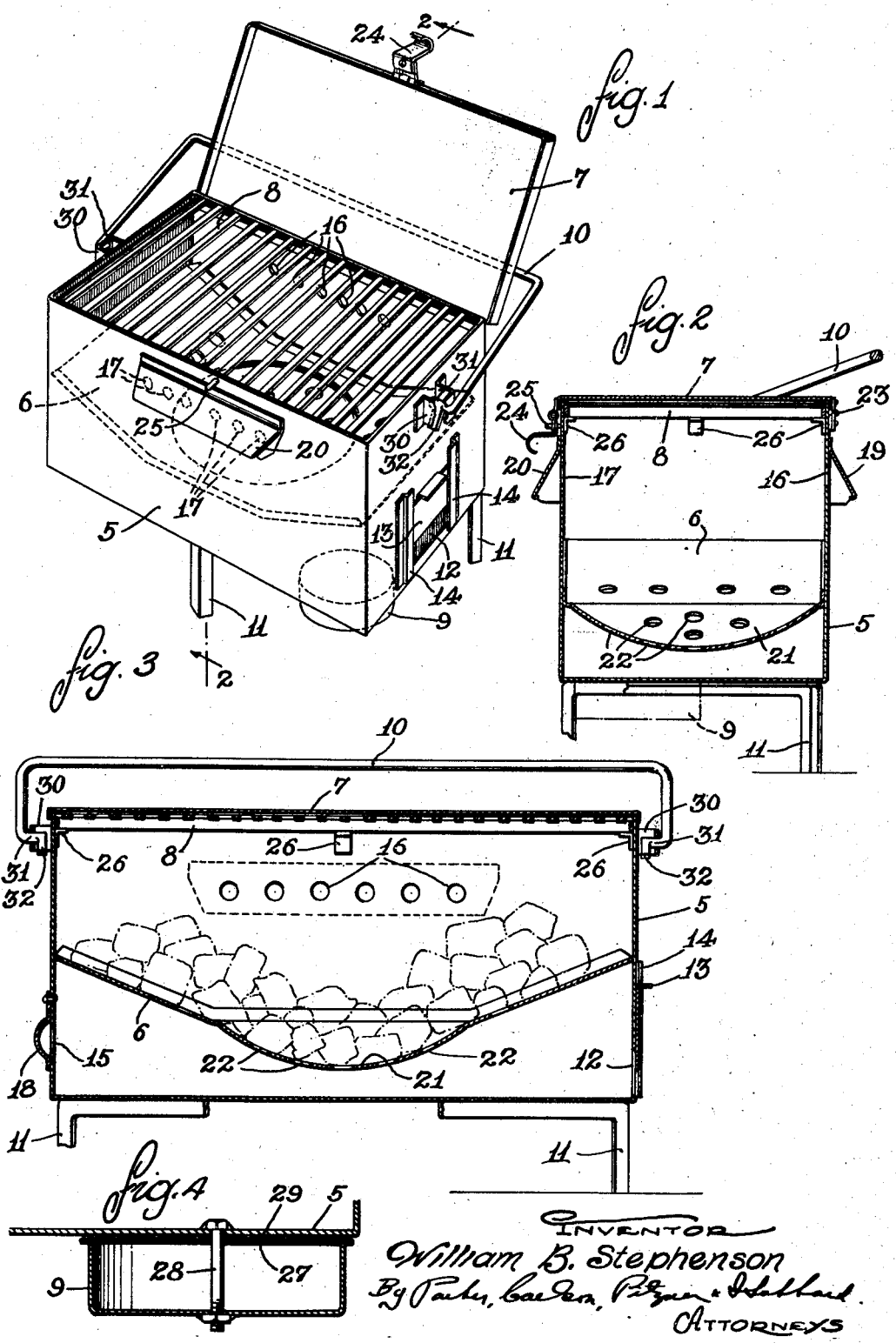
INVENTOR
William B. Stephenson
By Parker, Carter, Pitzner & Hubbard
ATTORNEYS Patented July 2, 1946

2,403,134

UNITED STATES PATENT OFFICE 2,403,134

CHARCOAL BURNER

William B. Stephenson, Fond du Lac, Wis.

Application June 13, 1942, Serial No. 446,897

1 Claim. (Cl. 126—29)

The main objects of this invention are to provide a compact, efficient, and conveniently portable charcoal burner; to provide an improved grate structure; to provide a conveniently attached receptacle for carrying fuel-igniting material; to provide means for preventing reflected illumination; and to provide an improved carrying handle.

In the particular embodiment of this invention shown in the accompanying drawing:

Figure 1 is a perspective view of the burner with grille in position, cover open, and the handle in its non-heating position.

Fig. 2 is a transverse vertical cross-section taken on the line 2—2 of Fig. 1.

Fig. 3 is a longitudinal cross-section taken in a vertical plane approximately through the middle of the burner.

Fig. 4 is a cross-sectional view of the receptacle for the fuel-igniting material, showing its insulated attachment to the casing.

In the particular embodiment herein shown, the burner comprises a casing 5, a fuel grate 6, a cover 7, a grille 8, a fuel-igniting material receptacle 9, and a carrying handle 10.

The casing 5 is a sheet metal formation, of rectangular shape in this particular embodiment, supported off the ground by means of legs 11. At one end of the casing below the grate 6 is arranged a draft opening 12 with a suitable vertically-slidable draft regulator 13. This regulator is held in place by means of angle strips 14. At the opposite end of the casing, likewise below the grate, is a breather port 15. At opposite sides of the casing near the top are series of draft ports 16 and 17.

In order to completely prevent any reflected illumination, the breather port 15 is covered with a shield 18 and the draft-port series 16 and 17 are likewise covered with shields 19 and 20, respectively.

One of the most important and novel features of this invention is the grate structure 6. In order to make a heater of this kind practical, it is important that the grate be arranged to perform a three-fold purpose: (1) to receive a substantial charge of charcoal; (2) to confine combustion to a limited area; and (3) to allow fresh fuel to automatically shift toward the area of combustion as it is needed to replace that which is consumed. To that end the grate 6 is arranged transversely of the casing 5 with the two ends inclined downwardly toward the combustion area. In this particular embodiment the combustion area is provided for by a depression in the central section of the grate which forms the bowl 21. This grate is a pressed-metal structure with flanged sides which permit ready attachment to the sides of the casing 5, preferably by welding. The bowl 21 has a series of perforations 22, which allow for the flow of air essential to combustion. In the structure illustrated, these apertures are extended into the portions of the inclined sections immediately contiguous to the bowl 21.

The cover 7, preferably flanged, is hinged at 23 along one side of the casing 5 and formed to fit rather snugly over the top of the casing. A latch 24, hinged to the front of the cover and containing a suitable aperture to receive the pin 25, permits a temporary locking of the cover in place. The cover is held in an angularly open position with respect to the casing 5 by means of its resting engagement against the handle 10.

The grille 8 is an optional part of the heater. Support for the grille is obtained by means of lugs 26 secured on the inner sides of the casing 5 near the top. These lugs are positioned so that the grille is supported approximately flush with the top edge of the casing and may be retained within the casing when the cover 7 is in its closed position.

In order that a device of this kind may be used under all possible conditions of weather and location, it is imperative that material for igniting the charcoal always be readily at hand. That imperative need is met in this invention by the provision of the cup or receptacle 9 detachably secured to the casing 5 preferably on the underside and removed as far as possible from the grate 6. In the particular form herein shown, this receptacle is cylindrical and comprises a detachable cover 27 and is held in removable position by a conventional bolt and nut 28.

A receptacle of this type and manner of attachment provides a safe and convenient storage for oil soaked rags or waste as a means for kindling the charcoal on the grate 6.

This arrangement of kindling means is extremely important, especially when the heater is in use in excessively wet sections of the country, or where the user is in areas providing no other kind of kindling. Moreover, the use of this kindling means eliminates the possibility of smoke which, along with the concealing of reflected light, is quite imperative where the heater is being used for outpost duty in military activities.

In order to make the heater readily portable, it is of course necessary to provide the handle 10. To insure the possibility of always being able to use this handle to transport the heater when in use, it is necessary that the handle be held free of contact with the heated casing. On the other hand, it is important to have the handle brought into the most compact relation to the casing when the heater is to be shipped. To accomplish this dual function, handle supports 30 are secured at the opposite ends of the casing 5. As herein illustrated, these are U-shaped strips with the ends flanged to facilitate attachment to the casing. These supports are apertured to receive the integral wrist pins 31 of the handle 10. These apertures are so positioned in the supports that the wrist-pin lugs 32 engage the bottom forward edges of the supports 30 when the handle 10 is swung rearwardly, thus holding the handle free of the casing 5 as shown in the drawing. The positioning of these apertures in the handle supports 30 and the length of the lugs 32 are such that, when the handle 10 is swung to the forward side of the casing 5, the lugs will clear the opposite or rear lower edges of the supports 30 and allow the handle to rest against the side of the casing.

In operation, a charge of charcoal is placed on the grate 6 and arranged so that only a portion of the fuel lodges in the combustion bowl 21. The bulk of the fuel is distributed over the inclined ends of the grate 6. The receptacle 9 is then removed from its position and a strip of oil-saturated rag or waste is removed and the receptacle replaced in position. The piece of oil-saturated rag or waste is inserted through the draft opening 12 and placed contiguous to the combustion bowl 21. After being ignited by a match or other convenient means, this piece of oil-soaked rag or waste will, in the course of two or three minutes, ignite the chcarcoal.

By virtue of the positioning of the apertures 22 the combustion will be confined more or less to the bowl section 21 of the grate 6. As the charcoal is consumed at this point, the unburned fuel resting on the inclined portions of the grate 6 will gradually gravitate toward the combustion bowl and continue the combustion until the last piece of charcoal has been consumed. The speed of burning, and therefore the intensity of the heat, can be regulated by adjusting the draft regulator 13.

When the heater is in use, the cover 7 may be opened as shown in Fig. 1, either to permit the use of the grille 8 or to receive the larger benefit of direct heat. For other cooking purposes, or when it is necessary to prevent all possibility of reflected light, the cover 7 may be closed as shown in Figs. 2 and 3. In all cases when in use, the handle would be held by lugs 32 and the supports 30 in the position shown in the drawing.

The drawing herein shows a specific embodiment of this invention on the basis of this description. However, it will be understood that details of this construction may be altered or omitted without departing from the spirit of the invention as defined by the following claim.

I claim as my invention:

A portable charcoal burner comprising, in combination, an elongated generally rectangular sheet metal casing, a sheet metal grate member extending from one end of the casing to the other and from side to side and being supported on said casing along opposite side edges, said member dividing the interior of said casing into a combustion space over said grate and an ashpit below said grate, a combustion bowl in said grate member formed by a depression of generally spherical contour located substantially at the center of the member, said depression being substantially coextensive with the width of the casing, combustion air apertures in the depressed portion of the grate member and in the end portions of the member contiguous thereto, the parts of said end portions remote from said depression being free of apertures and providing storage space for reserve fuel, said end portions sloping from the ends of said casing toward the combustion bowl whereby to provide a preheating zone for preparing the reserve fuel for combustion, the outer walls of said casing above and below said grate being formed with draft openings.

WILLIAM B. STEPHENSON.